(12) United States Patent
Gunnalan et al.

(10) Patent No.: US 11,228,957 B2
(45) Date of Patent: Jan. 18, 2022

(54) SEAMLESS ROAMING OF REAL TIME MEDIA SESSIONS

(71) Applicant: Microsoft Technology Licensing, LLC

(72) Inventors: Rajesh Gunnalan, Sammamish, WA (US); Mihhail Konovalov, Redmond, WA (US); Tin Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 16/570,961

(22) Filed: Sep. 13, 2019

(65) Prior Publication Data

US 2021/0084556 A1    Mar. 18, 2021

(51) Int. Cl.
*H04W 36/18*    (2009.01)
*H04W 12/082*    (2021.01)
*H04W 36/30*    (2009.01)

(52) U.S. Cl.
CPC ......... *H04W 36/18* (2013.01); *H04W 12/082* (2021.01); *H04W 36/30* (2013.01)

(58) Field of Classification Search
CPC .... H04W 36/18; H04W 12/082; H04W 36/30
See application file for complete search history.

(56) References Cited

U.S. PATENT DOCUMENTS

| 7,089,005 | B2 | 8/2006 | Reddy |
| 7,519,363 | B2 | 4/2009 | Shin et al. |
| 7,706,796 | B2 | 4/2010 | Rimoni et al. |
| 10,206,154 | B2 | 2/2019 | Ganesan |
| 2003/0028827 | A1* | 2/2003 | Gray ............... G06F 11/2294 714/46 |
| 2004/0008645 | A1 | 1/2004 | Janevski et al. |
| 2004/0087307 | A1 | 5/2004 | Ibe et al. |
| 2004/0203788 | A1 | 10/2004 | Fors et al. |

(Continued)

FOREIGN PATENT DOCUMENTS

| WO | 2005041612 A1 | 5/2005 |
| WO | 2018125989 A2 | 7/2018 |

OTHER PUBLICATIONS

Bernaschi et al., "Seamless Internetworking Of Wlans And Cellular Networks: Architecture And Performance Issues in A Mobile Ipv6 Scenario", In Proceedings of IEEE Wireless Communications, vol. 12, Issue 7, Jun. 20, 2005, pp. 73-80.

(Continued)

*Primary Examiner* — Kevin M Cunningham
(74) *Attorney, Agent, or Firm* — NovoTechIP International PLLC

(57) ABSTRACT

Techniques to select a network interface herein can be used with an application that is configured to send and receive data. These techniques include detecting an event indicative of a problem with network connectivity associated with a first network interface of the plurality of network interfaces in an application utilizing the first network interface; testing connectivity of each network interface of the plurality of network interfaces other than the first network interface to produce a set of candidate network interfaces; selecting a candidate network interface from the candidate network interfaces; and routing data for the application through the selected candidate network interface.

20 Claims, 8 Drawing Sheets

(56) References Cited

U.S. PATENT DOCUMENTS

| | | | |
|---|---|---|---|
| 2006/0084417 A1 | 4/2006 | Melpignano et al. | |
| 2006/0146842 A1* | 7/2006 | David | H04L 12/40013 |
| | | | 370/401 |
| 2006/0227717 A1* | 10/2006 | van den Berg | H04L 45/26 |
| | | | 370/252 |
| 2008/0040088 A1* | 2/2008 | Vankov | H04L 41/0681 |
| | | | 703/13 |
| 2010/0128696 A1* | 5/2010 | Fantini | H04L 29/12028 |
| | | | 370/331 |
| 2012/0166622 A1* | 6/2012 | Draznin | H04W 48/18 |
| | | | 709/224 |
| 2013/0308597 A1* | 11/2013 | Murphy | H04L 12/6418 |
| | | | 370/331 |
| 2013/0322401 A1 | 12/2013 | Visuri et al. | |
| 2017/0289885 A1 | 10/2017 | Kaushik | |

OTHER PUBLICATIONS

Higuchi et al., "Interface selection in hybrid V2V communications: A hierarchical approach", In Proceedings of IEEE Vehicular Networking Conference, Nov. 27, 2017, pp. 9-16.

"International Search Report and Written Opinion Issued in PCT Application No. PCT/US20/038300", dated Sep. 22, 2020, 14 Pages.

Cadavid, et al., "Handset Based Automatic Network Re-Selection System for GSM/GPRS and WiFi", In Proceedings of the 6th ACM International Symposium on Mobility Management and Wireless Access, Oct. 30, 2008, pp. 69-76.

\* cited by examiner

US 11,228,957 B2

SEAMLESS ROAMING OF REAL TIME MEDIA SESSIONS

BACKGROUND

Many types of applications rely on stable and continuous network connectivity to send and or receive data. Communications software may establish one or more network connections between parties to the communication session and/or with a communications platform server to receive data from and send data to other participants of a communication session. Applications for streaming audio content, video content, or both may establish one or more network connections with a content provider to receive the content streams. Navigation applications may also establish one or more network connections to map information, traffic information, and/or weather information providers. Other types of applications may also require stable network connectivity in order to provide a good user experience. Problems with network connections may cause content to be interrupted, corrupted, or delayed. There are significant areas for new and approved mechanisms for detecting poor network connectivity and seamlessly shifting to another network connection.

SUMMARY

An example computing device according to a first aspect of the invention includes a plurality of network interfaces configured to send and receive data, a processor, and a computer-readable medium. The computer-readable medium stores executable instructions for causing the processor to perform operations comprising: detecting an event indicative of a problem with network connectivity associated with a first network interface of the plurality of network interfaces in an application utilizing the first network interface; testing network connectivity of each network interface of the plurality of network interfaces other than the first network interface to produce a set of candidate network interfaces; selecting a candidate network interface from the candidate network interfaces; configuring the application to route data through the selected candidate network interface; and routing data for the application through the selected candidate network interface.

An example method executed by a data processing system for selecting a network interface according to a second aspect of the invention includes detecting via a processor an event indicative of a problem with network connectivity associated with a first network interface of a plurality of network interfaces in an application utilizing the first network interface; testing network connectivity of each network interface of the plurality of network interfaces other than the first network interface to produce a set of candidate network interfaces; selecting via the processor a candidate network interface from the candidate network interfaces; configuring via the processor the application to route data through the selected candidate network interface; and routing data via the processor for the application through the selected candidate network interface.

An example memory device according to a third aspect of the invention stores instructions that, when executed on a processor of a computing device, cause the computing device to select a network interface by: detecting via the processor an event indicative of a problem with network connectivity associated with a first network interface of the plurality of network interfaces in an application utilizing the first network interface; testing via the processor network connectivity of each network interface of the plurality of network interfaces other than the first network interface to produce a set of candidate network interfaces; selecting via the processor a candidate network interface from the candidate network interfaces; configuring via the processor the application to route data through the selected candidate network interface; and routing data via the processor for the application through the selected candidate network interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
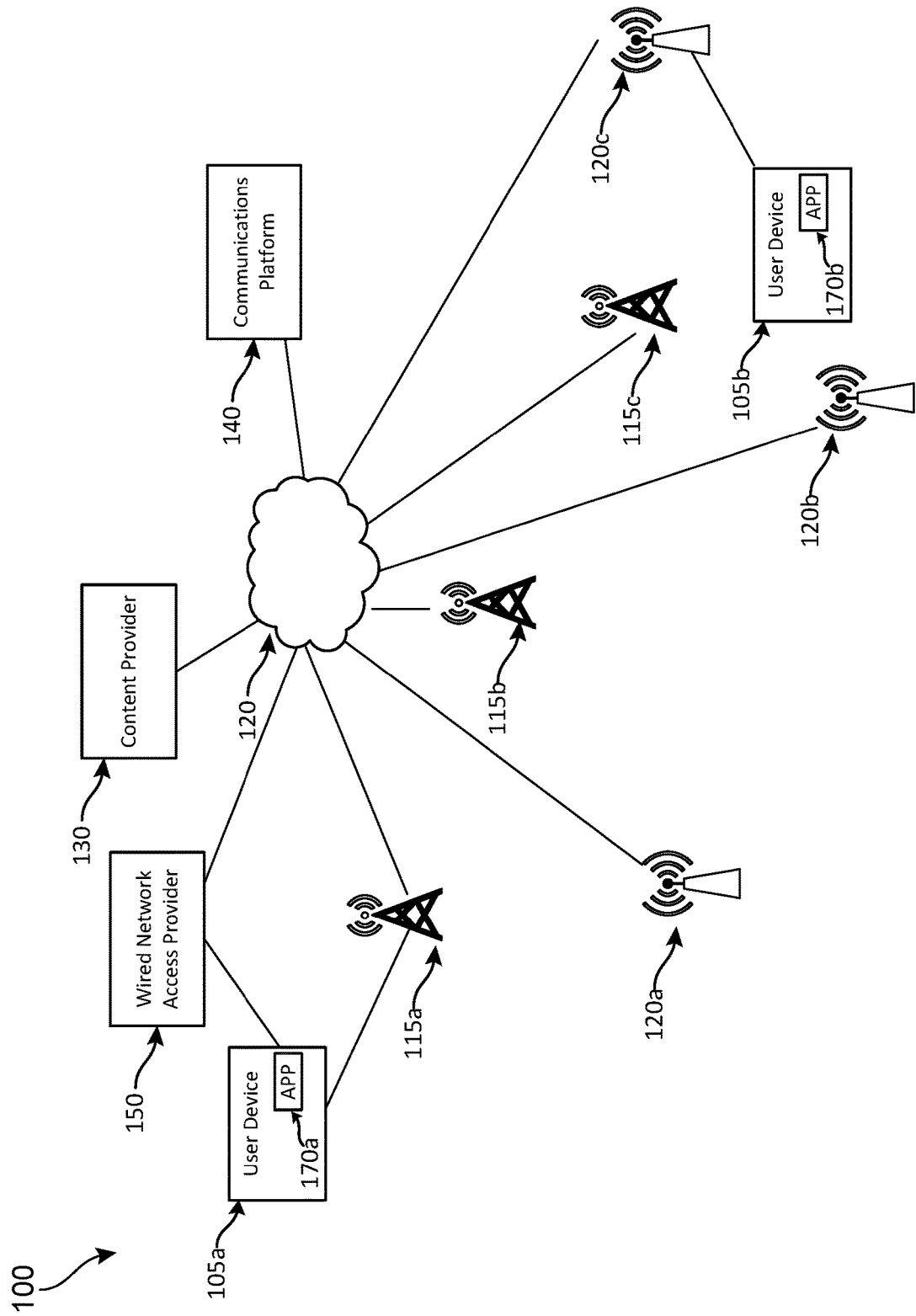
FIG. 1 presents an example operating environment in which seamless roaming techniques disclosed herein may be used.

FIG. 1 presents an example operating environment 100 in which techniques for seamlessly roaming between networks may provide a better user experience may be implemented. The example environment includes two user devices 105*a* and 105*b*. However, other implementations may include a single user device, while other implementations may include more than two user devices. The user devices 105*a*-105*c* may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. The user devices 105*a* and 105*b* may be mobile devices whose locations may change or may be devices which are generally kept at a fixed location.

The example operating environment includes a content provider 130. The content provider 130 may provide audio content, video content, or a combination thereof an application on a user device, such as the user devices 105*a* and 105*b*. The content provider 130 may, for example, support streaming services that provide streaming audio and/or video content. The content may comprise streaming music, movies, television, or other content. The content provider 130 may be a cloud-based system that is implemented on a network of servers hosted on the Internet that is accessible to user devices, such as user devices 105*a* and 105*b*.

The example operating environment includes a communications platform 140. The communications platform 140 may facilitate communication sessions among users. A communication session may include voice calls, video calls, text messaging sessions, or a combination thereof. The communications platform 140 may also facilitate file sharing and application integration for creating, modifying, and sharing content among users. The communications platform 140 may be a service provider that supports communication sessions for subscribers. In other implementations, the communications platform 140 may be a service offered by a corporation that facilitates communication between employees of the corporation and may be used by employees of the corporation to communicate with third parties outside of the corporation. The communications platform 140 may be cloud-based system that is implemented on a network of servers hosted on the Internet that is accessible to user devices, such as user devices 105*a* and 105*b*, over a network connection.

The example operating environment includes wireless access points 120*a*, 120*b*, and 120*c*. The wireless access points 120*a*, 120*b*, and 120*c* may be configured to support sending and receiving of data over various electromagnetic frequencies (e.g., radio frequencies), including wireless access points that support Institute of Electrical and Electronics Engineers (IEEE) 802.11 standards (e.g., 802.11g, 802.11n, and so forth referred to herein as "WLAN"), and other standards. The wireless access points 120*a*, 120*b*, and 120*c* may be associated with the same network or may be associated two or more different networks. The wireless access points 120*a*, 120*b*, and 120*c* may be associated with a personal or private network, a corporate network which may include many wireless access points, a subscription-based publicly accessible network, a public network such as a municipal Wi-Fi network. Depending upon the affiliation of the wireless access points 120*a*, 120*b*, and 120*c* with a network, the user devices 105*a* and 105*b* may or may not be permitted to establish a network connection via the wireless access points. For example, a subscription-based network may exclude users that are not subscribers to the network, an enterprise network may exclude users not affiliated with the corporation, and a personal network may exclude users that do not have authentication credentials for the network.

The example operating environment includes wireless base stations 115*a*, 115*b*, and 115*c*. The wireless base stations 115*a*, 115*b*, and 115*c* may be configured to support sending and receiving data over various RF frequencies, including wireless base stations that support global system for mobile communications network (GSM), code division multiple access (CDMA), and/or other wireless communications protocols. The wireless base stations 115*a*, 115*b*, and 115*c* may be affiliated with the same or different network operators. The wireless base stations 115*a*, 115*b*, and 115*c* may provide subscribers with wireless voice communications, wireless data communications, or both. Depending upon the affiliation of the wireless base stations 115*a*, 115*b*, and 115*c* with a network operator, the user devices 105*a* and 105*b* may or may not be permitted to establish a network connection via the wireless base stations 115*a*.

The example operating environment includes a wired network access provider 150. The wired network access provider 150 can provide wired network connectivity to a user device, such as the user devices 105*a* and 105*b*, where the user device includes a wired network interface. The wired network access provider 150 may support various types of wired network connections that uses physical cables for sending and receiving of data. The wired network access provider 150 may support Ethernet connections, coaxial cable connections, fiber optic connections, Broadband over Power Lines (BPL) and/or Digital Subscriber Line (DSL) connections just to illustrate a few examples of the types of connections that may be supported.

The user device 105*a* may include an application 170*a*, and the user device 105*b* may include an application 170*b*. The application 170*a* and the application 170*b* may be same application in some implementations and may facilitate communications between the user device 105*a* and the user device 105*b*. In other implementations, the application 170*a* and the application 170*b* are different applications and may provide different functionality to a user of their respective user devices. The application 170*a* and the application 170*b* may be associated with the content provider 130 and/or the communications platform 140. The application 170*a* and/or 170*b* may be client software associated with the content provider 130 that is configured to stream content from the content provider 130. The application 170*a* and/or 170*b* may be client software associated with the communications platform 140 that may facilitate establishing communications sessions between users of the client application via the communications platform 140. The client software may provide for real-time voice communications, video communications, or a combination thereof.

The seamless roaming techniques can be used by an application, such as the applications 170*a* and 170*b*, to detect network connection problems as early as possible, to test candidate networks that the application may rely on instead of a currently network, and to select a candidate network that the application can use for sending and/or receiving data. In one example implementation, the seamless roaming techniques can be used to switch between a Wi-Fi network connection and a mobile wireless network connection (also referred to herein as a "cellular network connection"). The user device may include a network interface for Wi-Fi and a network interface for the mobile wireless network. The user device can determine that a signal strength associated with the Wi-Fi signal has fallen below a first threshold indicative of a bad network connection. This threshold can be selected such that the network connection is not in immediate threat of completely being lost. The application can respond by attempting to connect to a mobile wireless network connection before the Wi-Fi signal degrades further in order to provide a better user experience. Furthermore, the techniques disclosed herein permit rapid transfer back to Wi-Fi as the Wi-Fi network becomes available again.

In contrast, conventional approaches to roaming often involve interruptions to the network connectivity that can severely impact the user experience. For example, in some conventional implementations, the user may begin experiencing media interrupts as the user leaves the Wi-Fi coverage area. For example, playback of streaming content may be interrupted as packets are lost or delayed as the Wi-Fi network connectivity degrades. The media interrupts may occur for a period of time before the network interface for the Wi-Fi is disabled by the user device and during that time network connectivity checks for Wi-Fi are failing. As a result, the user may experience a period of media interrupts user device disables the Wi-Fi network interface and the user device switches over to use a mobile network interface. This problem may be further exacerbated by the fact that the process used to check for available network connections may take several seconds for each iteration, and any new network interfaces that appear during an iteration will not be caught until the next iteration. This may lead to further interruptions in media playback.

The techniques disclosed herein are not limited to roaming between a Wi-Fi and mobile wireless network connection. These techniques may also be applied to connect to a best available network interface, which may include wired network interfaces in some implementations. Furthermore, the techniques disclosed herein provide another advantage over conventional techniques by testing the network connectivity of available network interfaces prior to selecting a new network interface. The connectivity of each of the network interfaces may be tested to determine whether the network interface is actually operational prior to switching the connection from the current network connection interface. Switching to an alternate network interface that has already been tested for connectivity may provide a smooth transition from one network to another than minimized impact on the user. Conventional techniques do not check whether an available network interface actually has connectivity before switching to the network interface. As a result, the user experience is further impacted if a network interface is selected that lacks network connectivity.

The applications 170a and 170b may include a user interface component that notifies the user that network problems have been detected, and that the application is in the process of switching to an alternate network interface that should provide a better user experience. The user interface component can be configured to notify that user that the network connectivity has been restored before disappearing. By notifying the user that remedial measures are being taken, the user is less likely to attempt to restart a communication session, a streaming session, etc. Restarting such a session may be particularly disruptive and may interrupt the sending and/or receiving of content for a significant amount of time.

In some implementations, the user may define policy information that controls, at least in part, how the application handles roaming and network switching. A user may wish to limit or prevent the use of a cellular interface for transferring significant amounts of media content. Network operators often place caps on the amount of data that a subscriber may use within a certain period of time, and additional data may be expensive. Furthermore, the network operator may place throttling restrictions on the network connection in response to the user exceeding the data cap. The user may define a set of parameters that may limit when the user device may roam to a mobile wireless network. These parameters may include but are not limited to: (1) application restrictions—the user may restrict certain applications from utilizing a mobile wireless network connection; (2) data usage limits—the user may define how much data may be consumed per session, over a predetermined time period, or by a particular application due to roaming to a mobile wireless network; and (3) limits on audio and/or video quality while utilizing mobile wireless network connections to reduce the amount of data required by the application.

The following examples illustrate how the user policy may impact the selection of an alternative network interface in response to connectivity issues associated with a currently selected network interface. In a first example, a user of the user device 105b is streaming a movie from the content provider 130 using a video streaming application to watch the movie on a display of the user device 105b. The user may set up a policy that indicates that the application may not attempt to switch to a mobile network interface in response to the currently selected network interface experiencing connectivity problems. However, the policy may permit the application to connect to wired and/or other wireless network interfaces if available. For example, other Wi-Fi connections may be available, and the user may permit the application to switch to a different Wi-Fi network if a currently selected Wi-Fi network is experiencing problems.

In a second example, the user of the user device 105b is participating in a communications session that includes audio, video, or both with a user of the user device 105a. The communication session may be routed at least in part through the communications platform 140. Alternatively, the communication session may be a peer-to-peer communication session between the user devices that is facilitated by their respective applications 170a and 170b. The user of the user device 105b may set policy parameters that permit the application 170b to switch to another network interface, including a mobile wireless interface. In a third example, the user may be streaming content to the content server 130. The content server 130 in this example may be a social media server, and the user may be streaming video content to content server 130 the from the user device 105b. The user may set a policy that the application may switch to another network interface and may permit the use of a mobile wireless interface to ensure that the content continues to be streamed to the social media server. The user interface of the application may be configured to display a notification that the current network connection quality is degrading and that the application is migrating the application to a network interface that is using mobile data. The user interface may provide the user with an option to halt the content stream being uploaded, an option to prevent the migration to the mobile network interface, or both.

The user policy is one aspect of the network transitioning techniques disclosed herein. Another aspect is the application monitoring for one or more types of events that would trigger the application to transition from one network interface to another. Ideally, the trigger events will signal the application to transition from the currently selected network interface to a new interface early enough that the user experience is not significantly impacted, and the network connectivity of the currently selected network interface doesn't completely fail before an alternative network interface can be selected.

Figure 2:
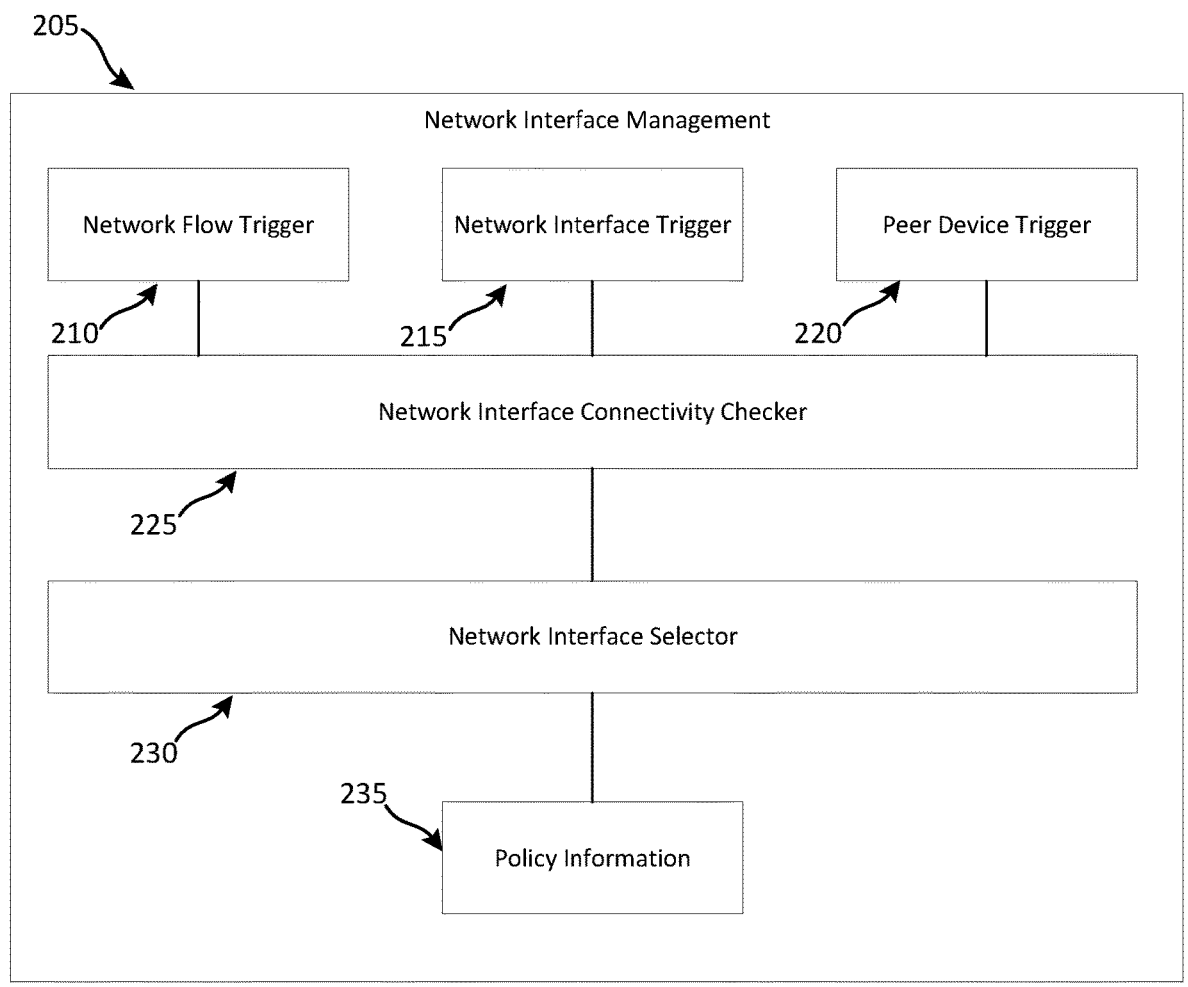
FIG. 2 is a diagram illustrating a network interface management unit that may be implemented as processor executable code that may be part of an application that requires network connectivity

FIG. 2 is a diagram illustrating a network interface management unit 205 that may be implemented as processor executable code that may be part of an application that requires network connectivity, such as the applications 170a and 170b discussed in the preceding examples. The network interface management unit 205 includes one or more triggers that are configured to cause the network interface management unit 205 to attempt to select an alternate network interface that the application can use to send and/or receive data.

The network interface management unit 205 may include one or more triggers that define an event or events that cause the network interface management unit 205 to attempt to select an alternate network interface to which the application can switch to for sending and/or receiving data. In some implementations, the network interface management unit 205, which is operating at the application level on the user device, may only have limited abilities for network connection management at that level. For example, the operating system of the user device may have low level network management facilities for switching between network connections and determining whether the network connection is active. The application and the network interface management unit 205, which is part of the application, must instead rely on application level signals to determine whether a network interface is experiencing problems and to determine whether another network interface is active before switching over to use the other network interface.

The network interface management unit 205 in this example includes three triggers: a network flow trigger 210, a network interface trigger 215, and a peer device trigger 220. These triggers are merely examples some of the types of triggers that may be used by the network interface management unit 205 to determine whether to attempt to switch the application over to a different network interface for sending and/or receiving data. In some implementations, the network interface management unit 205 may be configurable to allow a user to selectively enable one or more of the triggers. The application may provide a user interface in which the user can select which triggers to enable or disable. The user trigger configuration information may be stored in the policy information 235 associated with the user. Other triggers in addition to or instead of one or more of the triggers describe in this example.

The network flow trigger 210 may be used to detect interruptions in the flow of network traffic. One way that the network flow trigger 210 may determine that there is an interruption in the network traffic over the currently selected network interface is to monitor packets of incoming media content. If no packets are received for at least a first predetermined threshold period of time, then the network flow trigger 210 may determine that the network connection over the currently selected network interface may be experiencing a problem. In some implementations, the network flow trigger 210 may use signals exchanged between a server, such as the content server 130 or the communications platform 140, and the user device or signals exchanged between the user device and a peer device. The peer device may be another user device with which the user device is participating in a communication session. For example, the server and the user device, or the user device and the peer device may exchange signals during a communication session that can be used by a receiving device to determine that the sending device is still connected and participating in the communication session.

The network flow trigger 210 may determine that there is an interruption in the flow of network traffic if the signal from the server or the peer device is not received within a second predetermined period of time associated with such network signals. The network flow trigger 210 may be configured to determine that the selected network interface is still active if either: (1) a media packet is received within the first predetermined time since a last media packet was received; (2) or a signal is received from the server or peer device within the second predetermined time since the signal was last received. In this example configuration, a temporary interruption in the receipt of either the network signal, or the media packets alone, is not enough to trigger the network flow trigger 210.

The network interface trigger 215 may be configured to monitor a signal strength associated with a currently selected network interface and determine whether the signal strength falls below a predetermined threshold. In some implementations, the network interface trigger 215 may be configured to determine that when the currently selected network interface is a Wi-Fi interface and the Wi-Fi signal drops below a predetermined bad network threshold, then the network interface trigger 215 may determine that the selected network interface is experiencing problems and can trigger a migration to another network interface, such as a mobile wireless network interface. In some implementations, the network interface trigger 215 may be configured to facilitate migrating the back to the Wi-Fi network interface in response to determining that there is a Wi-Fi network that is active and available for connection that has a signal strength that is greater than a predetermined good network threshold. The good network threshold may be defined as a higher signal strength than the bad network threshold to prevent the network interface trigger 215 from becoming stuck in a loop where the network interface trigger 215 keeps attempting to migrate from the Wi-Fi network to a mobile wireless network connective and vice versa. This approach can provide seamless transition from a Wi-Fi network to a mobile wireless network and back again to provide an improved user experience. The network interface trigger 215 is not limited to triggering migrations between Wi-Fi and mobile wireless networks and may be used with wired network connections as well.

The peer device trigger 220 may be configured to monitor incoming network traffic for a signal from another device that indicates that the user device may be experiencing network connectivity problems. The other device may be another user device or server participating in a communication session with the user device which detects that a periodic signal or media stream from the user device has been interrupted. The peer device trigger may be used in situations where the application on the user device is sending a stream of content to another device. One scenario where this may occur is where the user device 105a is in a communication session with the user device 105b, and the user device 105a detects that the audio or video media stream from the user device 105b has been interrupted. The user device 105a may transmit a signal to the user device 105b over the network connection between the two devices that indicates that a possible network problem has arisen. The peer device trigger 220 may determine that the currently selected network interface is experiencing problems based on this signal.

Figure 3:
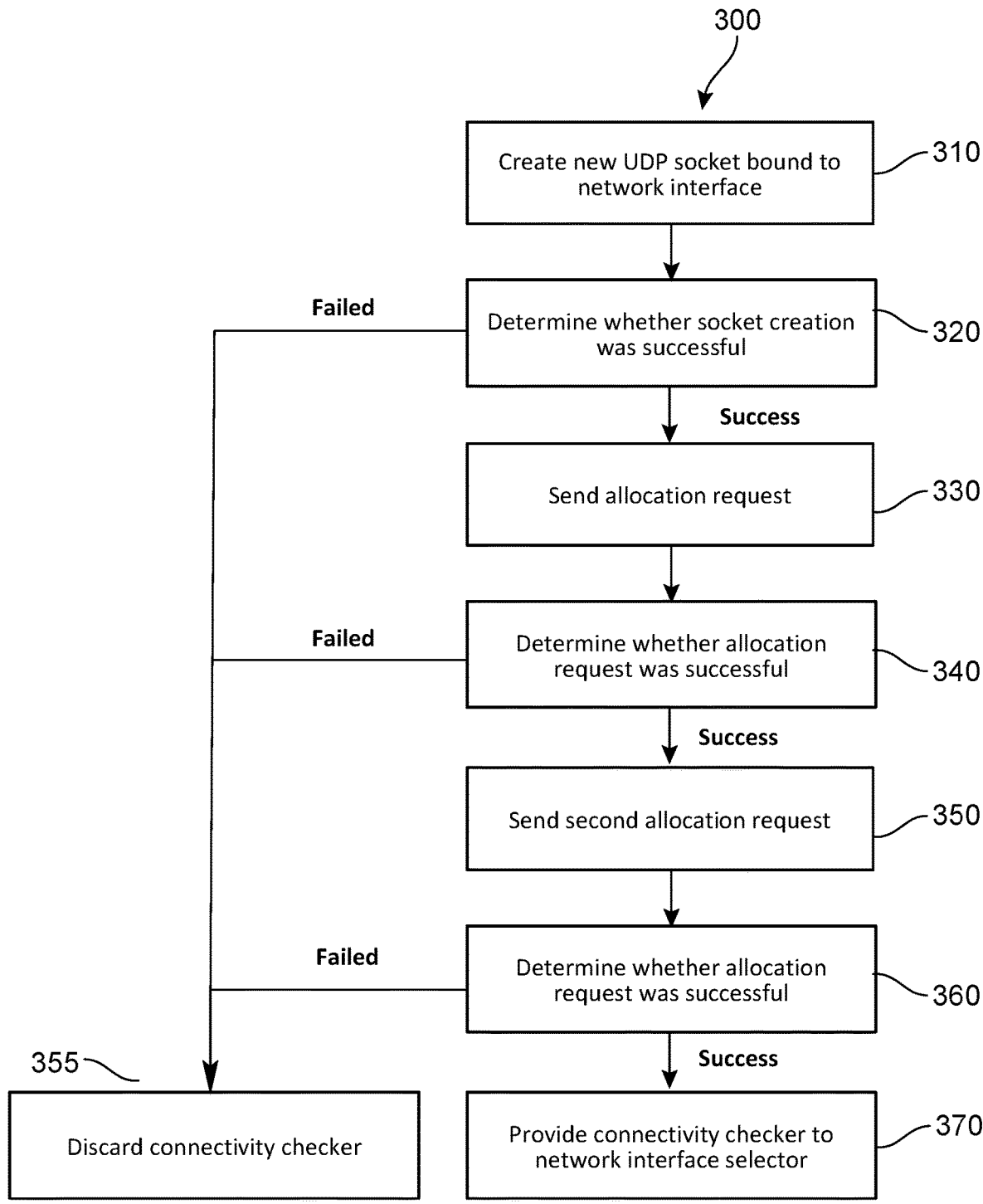
FIG. 3 presents a flowchart of an example process for checking the connectivity of a User Datagram Protocol (UDP) network interface network interface.
Figure 4:
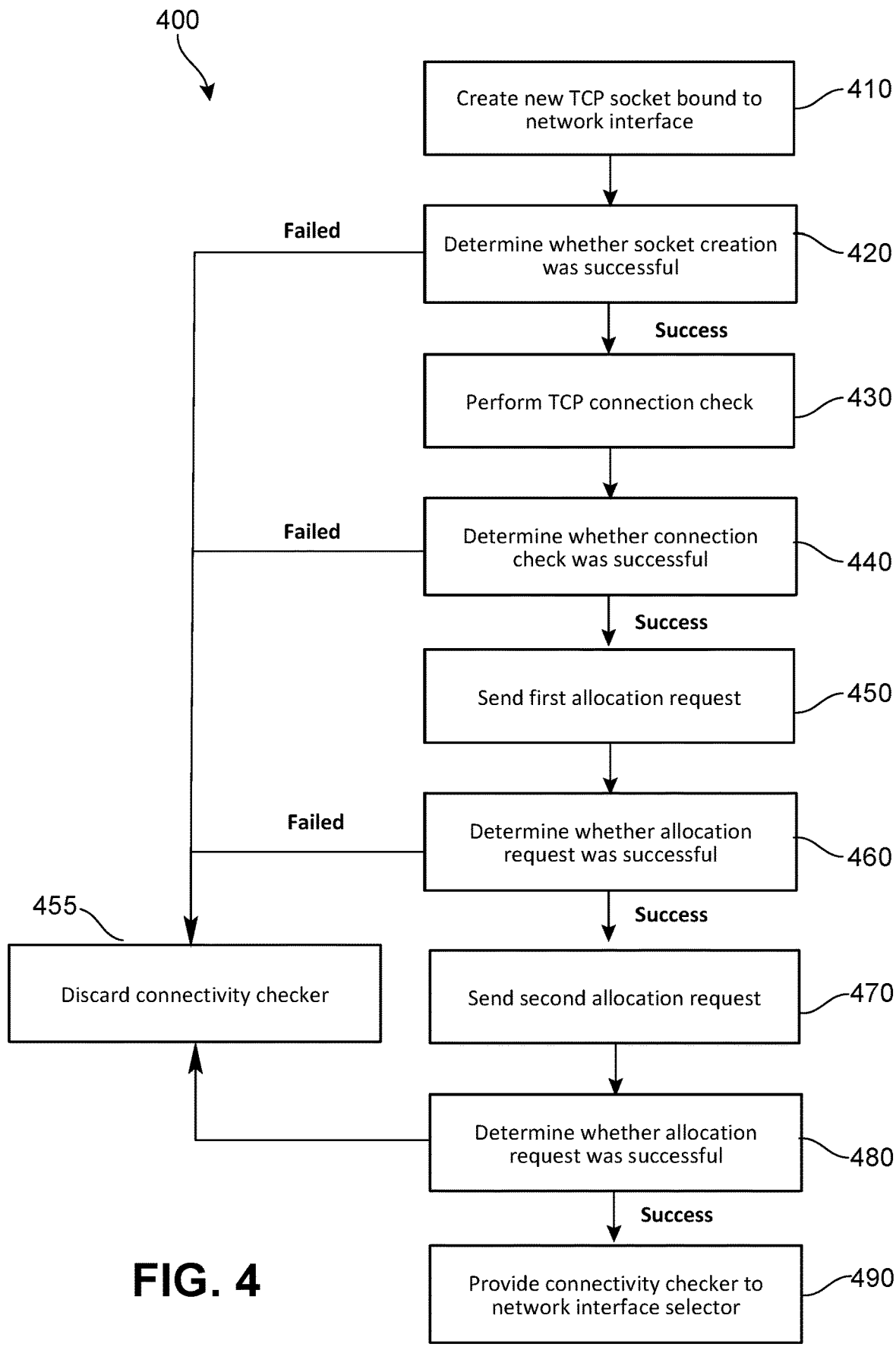
FIG. 4 presents a flowchart of an example process for checking the connectivity of a Transmission Control Protocol (TCP) network interface.

If any of the triggers determines that there is a network connectivity problem with the currently selected network interface, the network interface connectivity checker 225 may perform tests on each of the other network interfaces to determine whether network connectivity is possible using these other network interfaces. In one example, the user device includes a Wi-Fi network interface, a wired broadband network interface, and mobile wireless network interface. If one or more of the triggers determines that there is a problem with the currently selected Wi-Fi network interface, the network interface connectivity checker 225 may test network connectivity on the wired broadband network interface and the mobile wireless network interface to determine whether there is any connectivity. FIGS. 3 and 4 illustrate two examples of processes that the network interface connectivity checker 225 may use to test network connectivity of the other network interfaces that are currently not selected by the application.

The network interface connectivity checker 225 can be configured to determine network quality characteristics associated with the network associated with each network interfaces. The network quality characteristics may be used as ranking criteria by the network interface selector 230 for ranking the network interfaces. The network interface connectivity checker 225 may determine one or more characteristics of the network, such as packet loss, latency, and jitter. The network interface connectivity checker 225 may be configured to determine other characteristics of the network instead of or in addition to one or more of the characteristics. Packet loss occurs when packets do not reach their intended destination. Packet loss result from network congestion or transmission errors. Jitter refers to variations in packet arrival times and may result from network congestion, timing drift and route changes. Latency can refer to delays introduced by encoding and transmitting data across a network connection. All of these factors can impact audio and/or video content being transmitted and/or received. Audio and/or voice calls may be interrupted and/or suffer from poor playback at the receiver. The network interface connectivity checker 225 can be configured to perform one or more tests for these network quality characteristics and/or other network quality characteristics that may negatively impact audio and/or video call quality for communications sessions or playback of other audio and/or video content.

The network interface connectivity checker 225 can identify network interfaces that are active and can provide those to the network interface selector 230. The network interface selector can: (1) rank the active network interfaces to select a network interface to use instead of the currently network interface which is experiencing problems; and (2) exclude any network interfaces that are precluded based on the user policy information 235. The network interface selector 230 can rank the active network interfaces using various criteria. In some implementations, the network interface selector 230 may utilize a connection type to rank the active network interfaces. For example, the network interface connectivity checker may rank wired interfaces highest, rank Wi-Fi network interfaces a medium ranking, and rank mobile wireless network interfaces with a lowest ranking. In other implementations, the ranking may be based on a communication protocol used by the wireless network interface or by a network configuration associated with the network interface. For example, a network interface that relies on User Datagram Protocol (UDP) may be preferred over a network interface that relied on Transmission Control Protocol (TCP) network, because UDP may be faster because UDP doesn't include many of packet delivery guarantees provided by TCP. Furthermore, a network interface that uses a proxy may be ranked lower than a similar network interface that doesn't rely on a proxy due to latency may be introduced by the proxy. In some implementations, the network interface selector 230 may rank the network interfaces based on the network quality characteristics determined by the network interface connectivity checker 225. The network interface selector 230 may rank network interfaces higher that are determined to have low packet loss, latency, jitter, and/or other such characteristics that would negatively impact the quality of the network connection provided by the network interface. The network interface selector 230 may use both the connection type and the network quality characteristics when determining the ranking of the network interfaces. The network interface selector 230 may be configured to associate a weight with each of the one or more network quality characteristics so that certain network quality characteristics have a greater impact on the rank of the network interface. The network interfaces selector 230 may be configured to map each network quality characteristic to a numeric value and the sum of these values may be used to determine a rank for the network interface. A higher numeric value may represent a network interface having better network quality characteristics. In some implementations, the network interface selector 230 may use the network quality characteristic to determine a ranking score for each of the network interfaces and may use the network type to break a tie between network interfaces having a same ranking score by ranking a preferred network interface type higher than another network interface having a same ranking score.

The network interface selector 230 can also use the user policy information 235 to determine whether the user permits a particular network interface to be selected. As discussed in the preceding example, the user policy information can define situations where a particular network interface may not be selected. For example, the user policy information may identify situations where the application cannot switch over to use mobile wireless network data. The user policy may also indicate that a certain type of network interface may is preferred over another type of network interface, e.g. wired connections are preferred over mobile wireless network connections, which may affect the ranking of the available network interfaces but does not cause the network interface selector 230 to eliminate the less-preferred network interfaces from consideration.

The network interface selector 230 can select a network interface and the application can begin routing data through that interface. The user interface of the application may alert the user that the application is going to switch to the new network interface so that the user doesn't simply attempt to reset the application or restart a communication or streaming session. The interruption to the communication session or streaming session should be minimal, because the network interface management unit 205 preselects a working network interface to migrate to before ending use of the current network interface for sending and/or receiving data. This approach allows the network interface management unit 205 to switch over to a new network interface as problems with the current network interface are first identified. Thus, the network interface management unit 205 can transition the application over to a new network interface prior to the network connectivity provided by the current network interface from failing.

FIG. 3 is a flow chart illustrating an implementation of an example process 300 executed by network interface connectivity checker 225 to check the connectivity of a User Datagram Protocol (UDP) network interface. In some examples, some or all of the process 300 may be performed in combination with any of the features discussed in connection with FIGS. 1 and 2. The process 300 may be implemented by a data processing system, such as the user device 105 described in the proceeding examples or the example software architecture 700 illustrated in FIG. 7 and/or the example machine 800 illustrated in FIG. 8, and may be executed by an application being executed on the data processing system. The process 300 may be used by the network interface connectivity checker 225 to generate an instance of a UDP-based connectivity checker that can be used to test whether a network interface of the user device that uses UDP is active and can be used to communicate.

The process 300 may include a first operation 310 in which a new UDP socket bound to the network interface is created. A UDP socket needs to be opened in order to communicate using the UDP protocol. Once the UDP socket is bound to the network interface the socket can listen for incoming messages and send outgoing messages.

The process 300 may include a second operation 320 in which a determination is made whether the socket creation was successful. If the socket creation fails for any reason, the process 300 may continue to operation 355 in which the connectivity checker is discarded by the network interface connectivity checker 255. Otherwise, the process may continue with operation 330.

The process 300 may include a third operation 330 in which an allocation request is sent to a server. The server may be associated selected based on a currently selected network interface. For example, the server may be a media content server 130, a communications platform 140, or another server which is being communicated with through a current network connection. The server receiving the allocation request sends back a response indicating whether the allocation request was successful. The allocation request and response can be used to test whether the network interface has connectivity and could be used by the application to send and/or receive data instead of the currently selected network interface which may be experiencing problems.

The process 300 may include a fourth operation 340 in which a determination is made whether the allocation request was successful. If the allocation request failed, the process 300 may continue to operation 355 in which the connectivity checker object is discarded by the network interface connectivity checker 255. Otherwise, the process may continue with operation 350.

The process 300 may include a fifth operation 350 in which a second allocation request is sent to the server. A second allocation request can be performed to verify that there is connectivity over the network interface being tested.

The process 300 may include a sixth operation 360 in which a determination is made whether the second allocation request was successful. If the second allocation request failed, the process 300 may continue to operation 355 in which the connectivity checker object is discarded by the network interface connectivity checker 255. Otherwise, the process may continue with operation 370.

The process 300 may include a seventh operation 370 in which the connectivity checker is provided to the network interface selector 230. The connectivity checker has established that the network interface associated with the connectivity checker is active and capable of being used to establish a network connection. The connectivity checker can comprise an object includes information that identifies a particular network interface and provides an application programming interface (API) that defines a set of methods that the network interface selector 230 can be used to query the object to obtain information about the network interface. In some implementations, the network interface selector 230 may be provided information identifying the network interface rather than a connectivity checker object, and the network interface selector 230 may use the information identifying the network interface to rank the network interface against any other network interfaces that the network interface connectivity checker 225 determines also have network connectivity.

FIG. 4 is a flow chart illustrating an implementation of an example process 400 executed by network interface connectivity checker 225 to check the connectivity of a Transmission Control Protocol (TCP) network interface. In some examples, some or all of the process 400 may be performed in combination with any of the features discussed in connection with FIGS. 1 and 2. The process 400 may be implemented by a data processing system, such as the user device 105 described in the proceeding examples or the example software architecture 700 illustrated in FIG. 7 and/or the example machine 800 illustrated in FIG. 8, and may be executed by an application being executed on the data processing system. The process 400 may be used by the network interface connectivity checker 225 to generate an instance of a TCP-based connectivity checker that can be used to test whether a network interface of the user device that uses TCP is active and can be used to communicate.

The process 400 may include a first operation 410 in which a new TCP socket bound to the network interface is created. The socket is allocated an IP address and port number allowing the socket to receive data.

The process 400 may include a second operation 420 in which a determination is made whether the socket creation was successful. If the socket creation fails for any reason, the process 300 may continue to operation 455 in which the connectivity checker is discarded by the network interface connectivity checker 255. Otherwise, the process may continue with operation 330.

The process 400 may include a third operation 430 in which a TCP connection check is performed. The TCP connection check may be performed by initiating a TCP connection with a server that is known to operate reliably and is typically available. The network interface connectivity checker 225 may access test server information from a memory of the user device or other data processing system in which the process 400 is being executed. The test server information may include a network address and port information for one or more servers that the network interface connectivity checker 225 may attempt to connect to perform the TCP connection check.

The process 400 may include a fourth operation 440 in which a determination is made whether the TCP check was successful. If the fast TCP check fails for any reason, the process 400 may continue to operation 455 in which the connectivity checker is discarded by the network interface connectivity checker 255. Otherwise, the process may continue with operation 450.

The process 400 may include a fifth operation 450 in which an allocation request is sent to a server. The server may be different than the server in the preceding operations. The server may be selected based on a currently selected network interface. For example, the server may be a media content server 130, a communications platform 140, or another server which is being communicated with through a currently selected network interface. The server receiving the allocation request sends back a response indicating whether the allocation request was successful. The allocation request and response can be used to test whether the network interface has connectivity and could be used by the application to send and/or receive data instead of a currently selected network interface which may be experiencing problems.

The process 400 may include a sixth operation 460 in which a determination is made whether the allocation request was successful. If the allocation request failed, the process 300 may continue to operation 455 in which the connectivity checker is discarded by the network interface connectivity checker 255. Otherwise, the process may continue with operation 470.

The process 400 may include a seventh operation 470 in which a second allocation request is sent to the server. A second allocation request can be performed to verify that there is connectivity over the network interface being tested.

The process 400 may include an eighth operation 480 in which a determination is made whether the second allocation request was successful. If the allocation request failed, the process 400 may continue to operation 455 in which the connectivity checker is discarded by the network interface connectivity checker 255. Otherwise, the process may continue with operation 490.

The process 400 may include a ninth operation 490 in which the connectivity checker is provided to the network interface selector 230. The connectivity checker has established that the network interface associated with the connectivity checker is active and capable of being used to establish a network connection. The connectivity checker can comprise an object includes information that identifies a particular network interface and provides an API that defines a set of methods that the network interface selector 230 can be used to query the object to obtain information about the network interface. In some implementations, the network interface selector 230 may be provided information identifying the network interface rather than a connectivity checker object, and the network interface selector 230 may use the information to rank the network interface against any other network interfaces that the network interface connectivity checker 225 determines has network connectivity.

Figure 5:
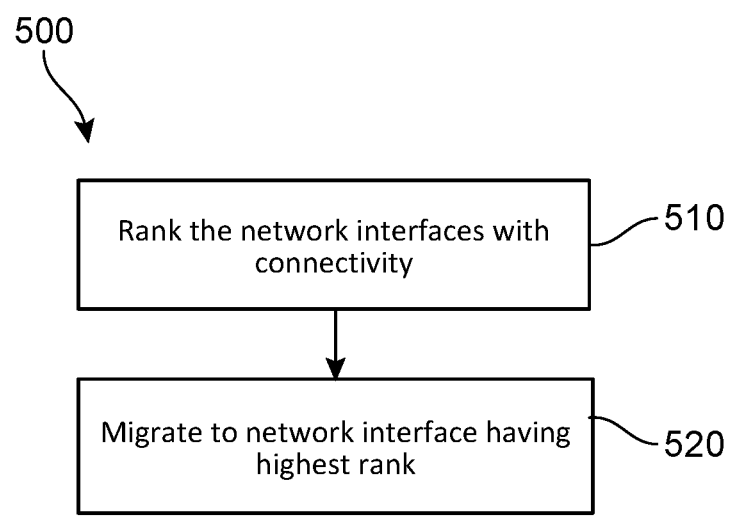
FIG. 5 presents a flowchart of an example process for selecting a network interface for sending and receiving data.

FIG. 5 is a flow chart illustrating an implementation of an example process 500 executed by network interface selector 230 to select a network interface for use by the application for sending and/or receiving data. In some examples, some or all of the process 500 may be performed in combination with any of the features discussed in connection with FIGS. 1 and 2. The process 500 may be implemented by a data processing system, such as the user device 105 described in the proceeding examples or the example software architecture 700 illustrated in FIG. 7 and/or the example machine 800 illustrated in FIG. 8, and may be executed by an application being executed on the data processing system.

The process 500 may include a first operation 510 in which the available network interfaces with connectivity are ranked. The network interfaces which have connectivity may have been identified by the network interface connectivity checker 225 as discussed in the preceding examples. The network interface connectivity checker 225 tests the connectivity each of the network interfaces prior to the network interface selector 230 selecting a network interface for handling sending and/or receiving of data by the application. As discussed in the preceding examples, the network interface connectivity checker 225 may determine network quality characteristics for each of the network interfaces, and the network interface selector 230 may use this information to rank the network interfaces.

The process 500 may include a second operation 520 in which the network interface selector 230 transitions the application to use the highest ranked network interface. The network interface selector 230 may display an indication on the user interface of the user device indicating that the application will be using a different network interface. The display of this indication may serve several purposes. First, displaying this indication may reassure the user that the connectivity problems with the first network connection were recognized by the application, and the application is now being reconfigured to route traffic through a different network interface that should provide improved service. Second, displaying this indication on the user interface can provide the user with an opportunity to halt a communication session, sending or receiving of streaming content, or other action in which data is being sent and/or received by the application. The user may wish to halt the sending and/or receiving of data depending upon the network connection being used. For example, if the network interface selector 230 has selected a mobile wireless network to handle the traffic on behalf of the application, the user may wish to no longer proceed with the action that was being performed by the application in order to reduce data usage on the mobile wireless network.

Figure 6:
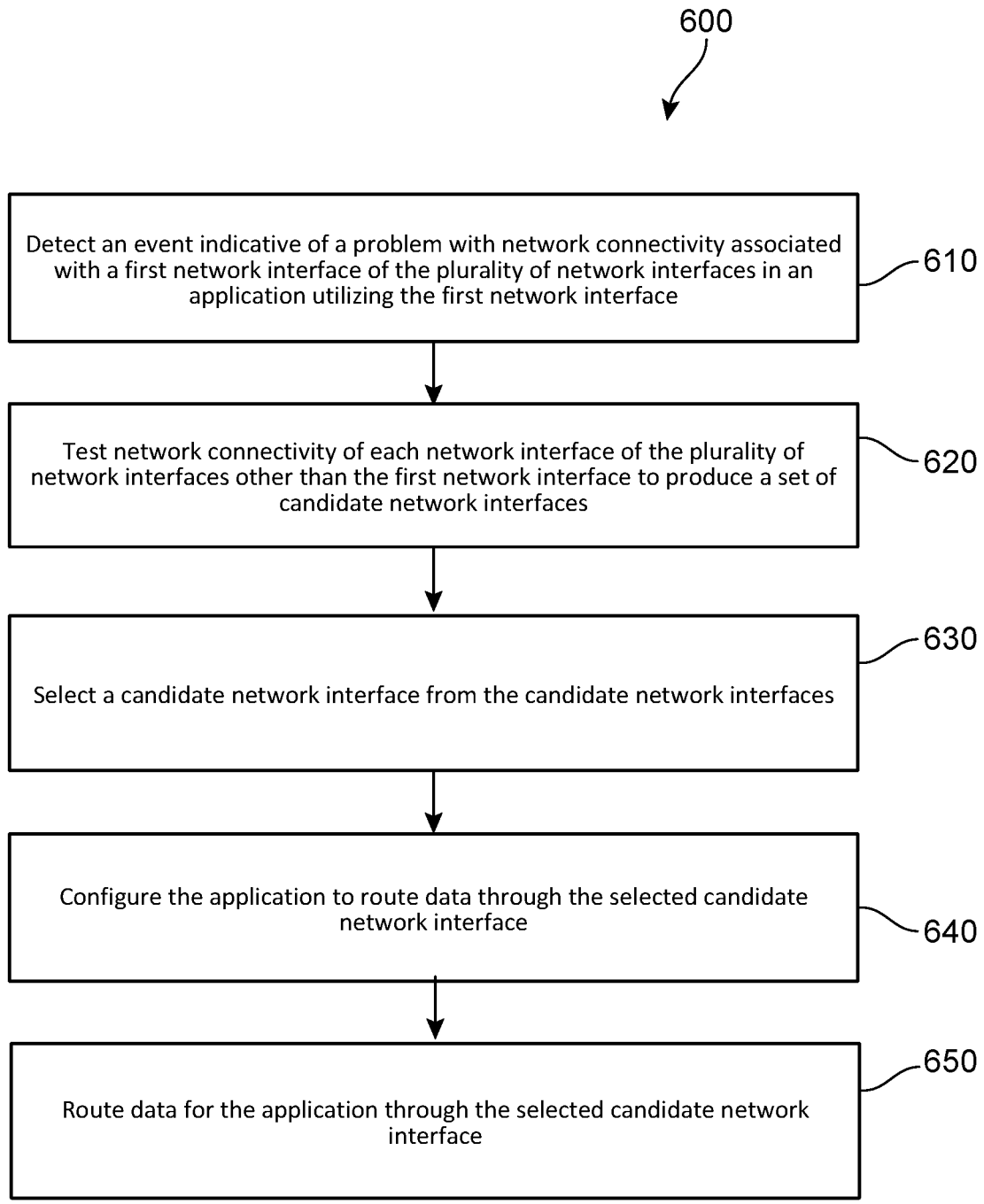
FIG. 6 presents a flowchart of an example process for selecting a network interface by an application.

FIG. 6 is a flow chart illustrating an implementation of an example process 600 for selecting a network interface by an application. In some examples, some or all of the process 600 may be performed in combination with any of the features discussed in connection with FIGS. 1 and 2. The process 600 may be implemented by a data processing system, such as the user device 105 described in the proceeding examples or the example software architecture 700 illustrated in FIG. 7 and/or the example machine 800 illustrated in FIG. 8, and may be executed by an application being executed on the data processing system. The application may roam from one network to another, and back again in some instances, to provide a better network connection for sending and/or receiving data from the application. As discussed in the preceding example, the application may be streaming content to or from the user device, and a poor network connection may The process 600 may include a first operation 610 in which an event is detected that is indicative of a problem with network connectivity associated with a first network interface of a plurality of network interfaces. The event is detected by an application that utilizing the first network interface. As discussed in the preceding examples, the application may require a reliable network connection for sending and/or receiving data. The application can monitor network activity on the first network interface for the occurrence of one or more trigger events indicative of a problem with network connectivity over the first network interface.

The process 600 may include a second operation 620 in which the application tests the network connectivity of the plurality of network interfaces other than the first network interface being used by the application to produce a set of candidate network interfaces. As discussed in the preceding examples, the user device may have a plurality of network interfaces, and the application may test each of these network interfaces for network connectivity before selecting a network interface for sending and/or receiving data. The user device may conduct network connectivity tests on each network interface by attempting to send and receive data using the network interface to determine whether the network interface is operating correctly. If a particular network interface is not operating correctly, the application may disregard that network interface. If the network interface appears to be operating correctly and the application was able to send and receive data via the network interface, the application may add the network interface to a set of candidate interfaces.

The process 600 may include a third operation 630 in which the application selects a candidate interface from the set of candidate network interfaces. As discussed in the preceding examples, the candidate network interfaces many be ranked by the application according to various criteria, such as the type of network interface (e.g. wired, WLAN, mobile wireless network), networking protocols used (e.g. UDP, TCP), or network configuration (e.g., proxy or no proxy). The candidate network interfaces may be ranked by network quality characteristics determined for each of the network interfaces. The candidate network interfaces may be ranked using both the network interface type and the network quality characteristics. The candidate network interfaces may also be ranked at least in part based on user profile information as discussed in the preceding examples. The user profile information may also be used to eliminate candidate interfaces from consideration. The user profile information may indicate that certain networks or types of networks may not be used for certain applications and/or for certain tasks. For example, the user may prohibit a mobile wireless network from being selected under certain circumstances to prevent data allocations associated with the network from being consumed by the application.

The process 600 may include a fourth operation 640 in which the application can be configured to utilize the selected candidate network interface. One or more operating parameters of the application may be set to configure the application to use the selected candidate network interface instead of the first network interface that the application was previously using for sending and/or receiving data.

The process 600 may include a fifth operation 650 in which the application can route data through the selected candidate network interface. The application can send and/or receive data via the selected candidate network interface. The selected network interface can continue to be used until a trigger event indicates that the application should once again consider using a different network interface.

In one example implementation, the first wireless interface was a Wi-Fi network interface, and a trigger event occurred which indicated that the signal strength of a signal associated with the Wi-Fi network has fallen below a first threshold (also referred to herein a "bad network threshold"). In this example, the candidate network interface is a mobile wireless network. The user profile does not prohibit the selection of the mobile wireless network in this example. The application tests the connectivity of the candidate wireless interface and is able to send and receive data using the candidate network interface. The application switches over to use the mobile wireless network. The user interface of the user device may display an indication that network problems have been detected in response to the occurrence of the trigger event. The user experience may or may not have been impacted at this point. Ideally, the bad network threshold is set to a high enough signal strength that the application will initiate a switch to another network interface before the user experience degrades too badly. The user may be notified that the application is in the process of switching to a different network interface while the application is testing the candidate network interfaces and selecting a candidate network interface. The notification may be displayed so that the user is aware that the application is attempting to establish a better network connection. The notification may disappear once the application has been reconfigured to use the selected candidate network interface.

The application may continue to monitor the status of the Wi-Fi network interface to determine whether the Wi-Fi signal associated with the previously selected Wi-Fi network or another Wi-Fi network has increased above a second threshold (also referred to herein as a "good network threshold"). The second threshold is a higher signal strength than the first wireless network. The difference between these two thresholds is to prevent the application from looping between the selecting the Wi-Fi network interface and the mobile wireless network interface. In this example, the signal strength of the Wi-Fi network has increased above the good network threshold. The application may initiate a change back to the Wi-Fi network interface to conserve the data associated with the data plan of the mobile wireless network. The application may test the connectivity of the Wi-Fi network interface prior to configuring the application to use the Wi-Fi network interface. This approach can be used to conservatively use limited amounts of data from data plan associated with the mobile wireless network to provide an improved user experience in the application. The application can migrate back to the WiFi network interface as soon as possible, in order to minimize the amount of network data consumed on the mobile wireless network.

Examples of the operations illustrated in the flow charts shown in FIGS. 3-6 are described in connection with FIGS. 1 and 2. It is understood that the specific orders or hierarchies of elements and/or operations disclosed in FIGS. 3-6 are example approaches. Based upon design preferences, it is understood that the specific orders or hierarchies of elements and/or operations in FIGS. 3-6 can be rearranged while remaining within the scope of the present disclosure. FIGS. 3-6 present elements of the various operations in sample orders and are not meant to be limited to the specific orders or hierarchies presented. Also, the accompanying claims present various elements and/or various elements of operations in sample orders and are not meant to be limited to the specific elements, orders, or hierarchies presented.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
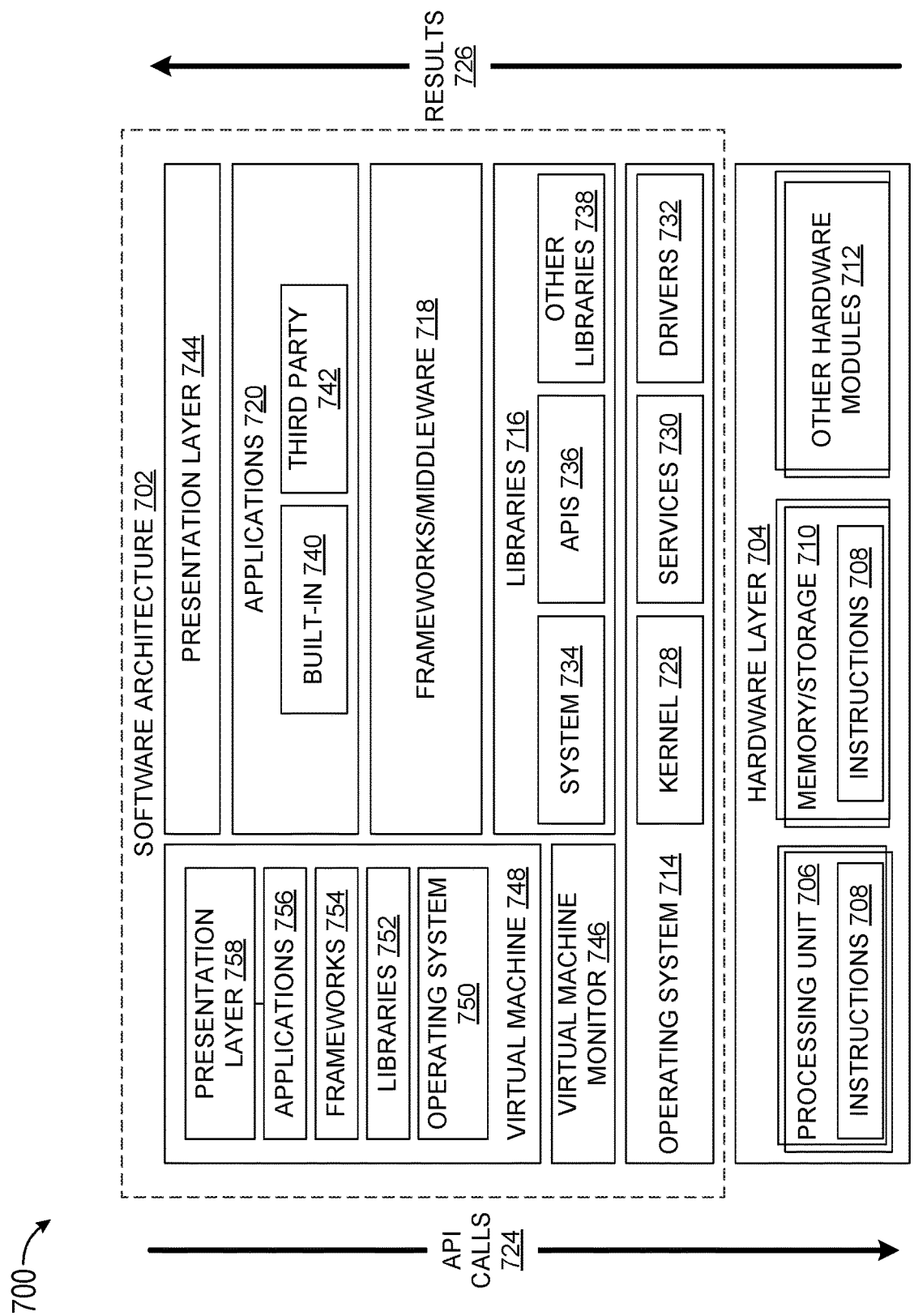
FIG. 7 is a block diagram illustrating an example software architecture, various portions of which may be used in conjunction with various hardware architectures herein described, which may implement any of the features herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 714, libraries 752, frameworks 754, applications 756, and/or a presentation layer 758.

Figure 8:
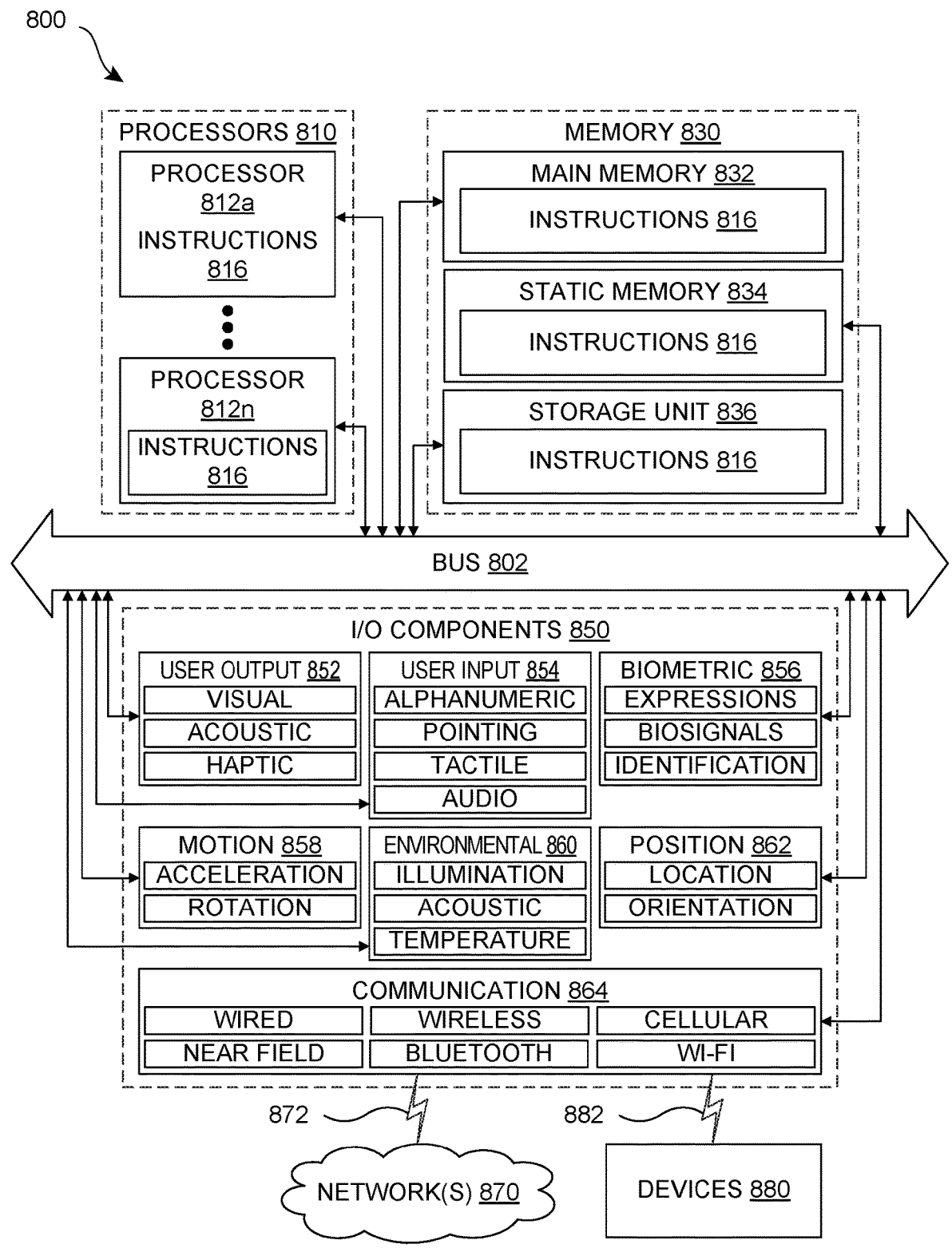
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors $812a$ to $812n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:
   a plurality of network interfaces configured to send and receive data;
   a processor; and
   a computer-readable medium storing executable instructions for causing the processor to perform operations comprising:
     selectively enabling a trigger as one of a network flow trigger to detect interruptions in a flow of network traffic, a network interface trigger to monitor a signal strength associated with a network interface, and a peer device trigger to monitor a signal from a peer device;
     detecting an event indicative of a problem with network connectivity associated with a first network interface of the plurality of network interfaces in an application utilizing the first network interface, the detected event corresponding to the selectively enabled trigger;
     testing connectivity of each network interface of the plurality of network interfaces other than the first network interface to produce a set of candidate network interfaces;
     selecting a candidate network interface from the candidate network interfaces; and
     routing data for the application through the selected candidate network interface.

2. The computing device of claim 1, wherein the plurality of network interfaces comprises a Wi-Fi network interface and a mobile wireless network interface, wherein the first network interface is the Wi-Fi network interface, and wherein detecting the event indicative of a problem with network connectivity associated with the first network interface of the plurality of network interfaces in the application utilizing the first network interface comprises:
   measuring a signal strength of a signal associated with a Wi-Fi network using the Wi-Fi network interface; and
   determining that there is a problem with network connectivity if the signal strength is less than a first predetermined threshold.

3. The computing device of claim 2, wherein the computer-readable medium further includes instructions for causing the processor to perform operations comprising:
   selecting the mobile wireless network interface;
   configuring the application to route data through the mobile wireless network interface; and
   routing data for the application through the mobile wireless network interface until a signal strength associated with the Wi-Fi network reaches a second predetermined threshold, where the second predetermined threshold is higher than the first predetermined threshold.

4. The computing device of claim 1, wherein testing connectivity of each network interface of the plurality of network interfaces other than the first network interface to produce a set of candidate network interfaces comprises:
   configuring a respective network interface of the plurality of network interfaces;
   attempting to send and receive data via the respective one of the plurality of network interfaces; and
     adding the respective network interface of the plurality of network interfaces responsive to successfully sending and receiving data via the network interface.

5. The computing device of claim 1, wherein selecting the candidate network interface from the candidate network interfaces further comprises:
   ranking the candidate network interfaces based on one or more predetermined ranking criteria; and
   selecting a candidate network interface having a highest rank.

6. The computing device of claim 5, wherein the computer-readable medium further includes instructions for causing the processor to perform operations comprising:
   eliminating at least one candidate network interface based on user policy information.

7. The computing device of claim 5, wherein the computer-readable medium further includes instructions for causing the processor to perform operations comprising:
   changing a ranking of at least one candidate network interface based on user policy information.

8. A method, executed by a data processing system for selecting a network interface, comprising:
   selectively enabling a trigger as one of a network flow trigger to detect interruptions in a flow of network traffic, a network interface trigger to monitor a signal strength associated with the network interface, and a peer device trigger to monitor a signal from a peer device;
   detecting via a processor an event indicative of a problem with network connectivity associated with a first network interface of a plurality of network interfaces in an application utilizing the first network interface, the detected event corresponding to the selectively enabled trigger;
   testing connectivity of each network interface of the plurality of network interfaces other than the first network interface to produce a set of candidate network interfaces;
   selecting via the processor a candidate network interface from the candidate network interfaces; and
   routing data via the processor for the application through the selected candidate network interface.

9. The method of claim 8, wherein the plurality of network interfaces comprises a Wi-Fi network interface and a mobile wireless network interface, wherein the first network interface is the Wi-Fi network interface, and wherein detecting the event indicative of a problem with network connectivity associated with the first network interface of the plurality of network interfaces in the application utilizing the first network interface comprises:
   measuring a signal strength of a signal associated with a Wi-Fi network using the Wi-Fi network interface; and
   determining that there is a problem with network connectivity if the signal strength is less than a first predetermined threshold.

10. The method of claim 9, further comprising:
    selecting the mobile wireless network interface;
    configuring the application to route data through the mobile wireless network interface; and
    routing data for the application through the mobile wireless network interface until a signal strength associated with the Wi-Fi network reaches a second predetermined threshold, where the second predetermined threshold is higher than the first predetermined threshold.

11. The method of claim 9, wherein testing connectivity of each network interface of the plurality of network interfaces other than the first network interface to produce a set of candidate network interfaces comprises:
    configuring a respective network interface of the plurality of network interfaces;
    attempting to send and receive data via the respective one of the plurality of network interfaces; and
    adding the respective network interface of the plurality of network interfaces responsive to successfully sending and receiving data via the network interface.

12. The method of claim 11, wherein selecting the candidate network interface from the candidate network interfaces further comprises:
    ranking the candidate network interfaces based on one or more predetermined ranking criteria; and
    selecting a candidate network interface having a highest rank.

13. The method of claim 12, further comprising:
    eliminating at least one candidate network interface based on user policy information.

14. The method of claim 12, further comprising:
    changing a ranking of at least one candidate network interface based on user policy information.

15. A memory device storing instructions that, when executed on a processor of a computing device, cause the computing device to select a network interface, by:
    selectively enabling a trigger as one of a network flow trigger to detect interruptions in a flow of network traffic, a network interface trigger to monitor a signal strength associated with the network interface, and a peer device trigger to monitor a signal from a peer device;
    detecting via the processor an event indicative of a problem with network connectivity associated with a first network interface of a plurality of network interfaces in an application utilizing the first network interface, the detected event corresponding to the selectively enabled trigger;
    testing via the processor connectivity of each network interface of the plurality of network interfaces other than the first network interface to produce a set of candidate network interfaces;
    selecting via the processor a candidate network interface from the candidate network interfaces; and
    routing data via the processor for the application through the selected candidate network interface.

16. The memory device of claim 15, wherein the plurality of network interfaces comprises a Wi-Fi network interface and a mobile wireless network interface, wherein the first network interface is the Wi-Fi network interface, and wherein detecting the event indicative of a problem with network connectivity associated with the first network interface of the plurality of network interfaces in the application utilizing the first network interface comprises:
    measuring a signal strength of a signal associated with a Wi-Fi network using the Wi-Fi network interface; and
    determining that there is a problem with network connectivity if the signal strength is less than a first predetermined threshold.

17. The memory device of claim 16, wherein the memory device further includes instructions for causing the processor to perform operations comprising:
    selecting the mobile wireless network interface;
    configuring the application to route data through the mobile wireless network interface; and
    routing data for the application through the mobile wireless network interface until a signal strength associated with the Wi-Fi network reaches a second predetermined threshold, where the second predetermined threshold is higher than the first predetermined threshold.

18. The memory device of claim 15, wherein testing connectivity of each network interface of the plurality of network interfaces other than the first network interface to produce a set of candidate network interfaces comprises:
    configuring a respective network interface of the plurality of network interfaces;
    attempting to send and receive data via the respective one of the plurality of network interfaces; and
    adding the respective network interface of the plurality of network interfaces responsive to successfully sending and receiving data via the network interface.

19. The memory device of claim 18, wherein selecting the candidate network interface from the candidate network interfaces further comprises:
    ranking the candidate network interfaces based on one or more predetermined ranking criteria; and
    selecting a candidate network interface having a highest rank.

20. The memory device of claim 19, further comprising at least one of:
    eliminating at least one candidate network interface based on user policy information; and
    changing a ranking of at least one candidate network interface based on user policy information.

* * * * *